United States Patent [19]

Manitt et al.

[11] Patent Number: 5,020,364

[45] Date of Patent: Jun. 4, 1991

[54] WIND TUNNEL MODEL POSITIONING DEVICE

[75] Inventors: Philip J. Manitt, East Setauket; Vincent F. Thomas, Lynbrook; William J. McAllister, Smithtown, all of N.Y.

[73] Assignee: Grumman Aerospace Corporation, Bethpage, N.Y.

[21] Appl. No.: 530,295

[22] Filed: May 30, 1990

[51] Int. Cl.⁵ .................................... G01M 9/00
[52] U.S. Cl. .......................................... 73/147
[58] Field of Search ......................... 73/147; 901/18

[56] References Cited

U.S. PATENT DOCUMENTS 4,547,119 10/1985 Chance et al. ................. 901/18
4,658,635 4/1987 Pszolla et al. .................. 73/147
4,862,739 9/1989 Dobbs ............................ 73/147

Primary Examiner—Donald O. Woodiel
Attorney, Agent, or Firm—Pollock, VandeSande & Priddy

[57] ABSTRACT

A tiltable telescoping column is equipped with a rotating upper joint. The upper joint has an aircraft model support member for securing the model to the joint. The length of the telescoping column may be varied as its inclination changes. These motions may occur simultaneous with rotation of the upper joint so that the upper joint is capable of describing a vertically oriented circle of constant radius. The column may be mounted to a turntable for achieving compound angle displacement of the model.

3 Claims, 4 Drawing Sheets

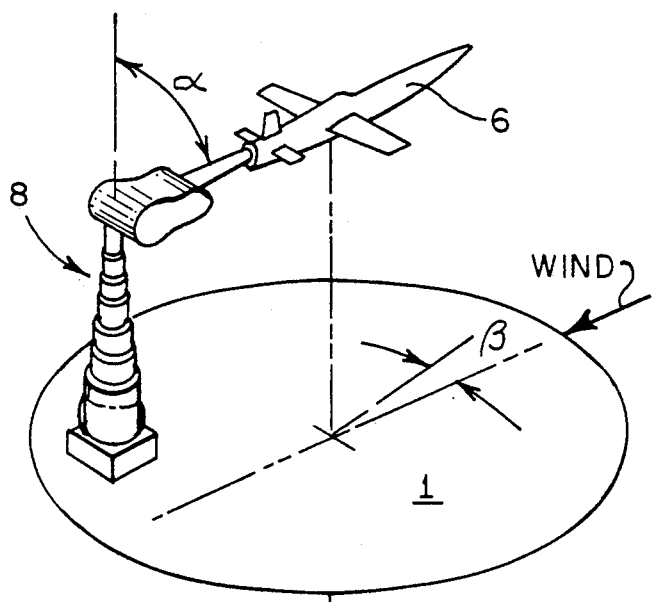
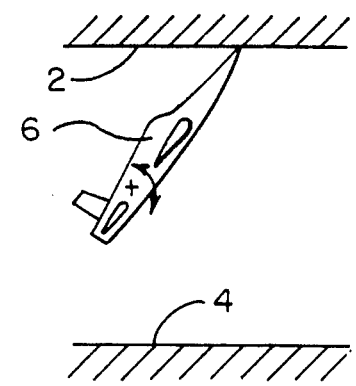
FIG. 1
FIG. 2
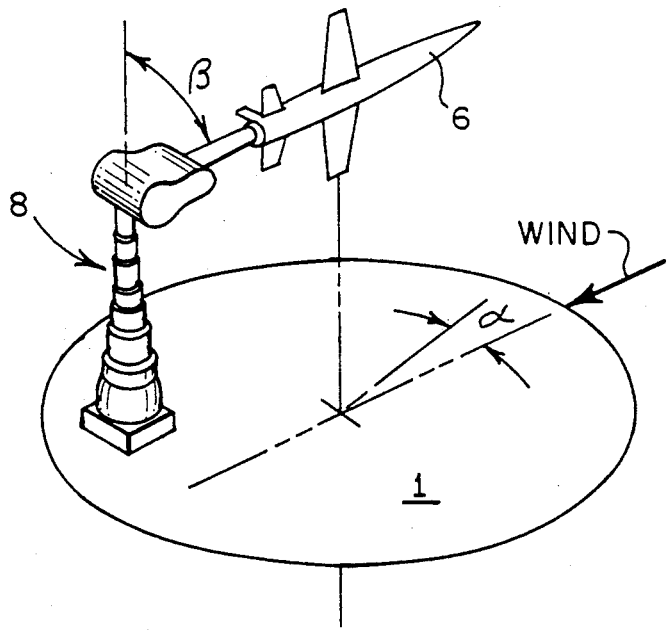
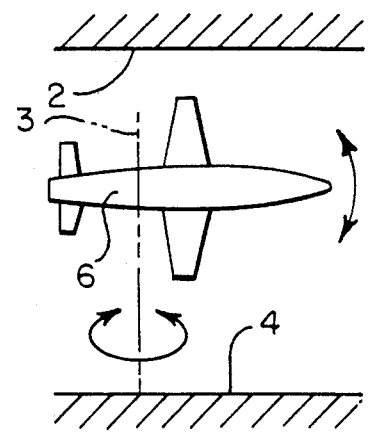
FIG. 3
FIG. 4

WIND TUNNEL MODEL POSITIONING DEVICE

FIELD OF THE INVENTION

The present invention relates to support and positioning devices for wind tunnel models, and more particularly to such a mechanism for executing compound continuous angular displacements.

BACKGROUND OF THE INVENTION

After theoretical aircraft designs have been completed, it is customary to produce a model of the aircraft and subject it to wind tunnel testing for determining the aerodynamic characteristics of the plane.

BRIEF DESCRIPTION OF THE PRESENT INVENTION

The prior art includes many types of movable support mechanisms for models to be placed in wind tunnels. Typically, these include the use of mechanical offsets to extend their nominal range of ±15° to +90° during which time measurements and observations are made. However, as high performance characteristics increase for modern aircraft, it is essential that measurements and observations be made during continuous displacement of an aircraft over a 90° range of pitch and yaw angles.

The present invention accomplishes the needs previously set forth by presenting a rotational joint on a telescoping and pivotal column which supports and positions an aircraft model in a wind tunnel to obtain a full range of useful pitch and yaw positions. Both pitch and yaw may be changed in a continuous fashion during tests from −5° to +90° relative to a wind tunnel axis. This is in marked contrast to existing mechanisms which have limited capability and cannot continuously obtain extreme test attitudes required for testing state-of-the-art aircraft designs.

Furthermore, since the present design lends itself toward computer control, a mounted model may be moved for continuous displacement of compound yaw and pitch angles to obtain thorough test data.

Basically, the present invention includes a pivotal joint which is mounted to a pivoting telescoping column. A rod-like member, known as a sting, is secured at one end thereof to the joint and at an opposite end to the back end of a model. By varying the elongation and angular position of the telescoping column in conjunction with the angular position of the joint, the joint may describe a vertically oriented circle. As a result, the model plane will effectively have a rotational axis fixed in space. With the model wings disposed horizontally, this will simulate a continuous pitch angle variation of the model. With the model rotated 90° so that the wings are positioned vertically, the mechanism can continuously vary the effective yaw angle. Variations in the pitch and the yaw angles can be between −5° and +90°.

By mounting the entire mechanism on a movable turntable within a wind tunnel, the aircraft can be given a compound pitch and yaw orientation due to displacement of the mechanism simultaneous with rotation of the turntable.

BRIEF DESCRIPTION OF THE FIGURES

The above-mentioned objects and advantages of the present invention will be more clearly understood when considered in conjunction with the accompanying drawings, in which:

FIG. 1 is a diagrammatic and simplified view of the present invention with the wings of an aircraft model maintained in a horizontal direction;

FIG. 2 is a diagrammatic side view of an aircraft positioned within a wind tunnel to demonstrate model displacement in pitch;

FIG. 3 is a diagrammatic and simplified view of the present the wings of an aircraft model maintained in a vertical direction;

FIG. 4, is a diagrammatic view of the model, similar to that of FIG. 2, but instead indicating orientation of the model wings in a vertical position and undergoing displacement in pitch and yaw;

DETAILED DESCRIPTION OF THE INVENTION

Figure 5:
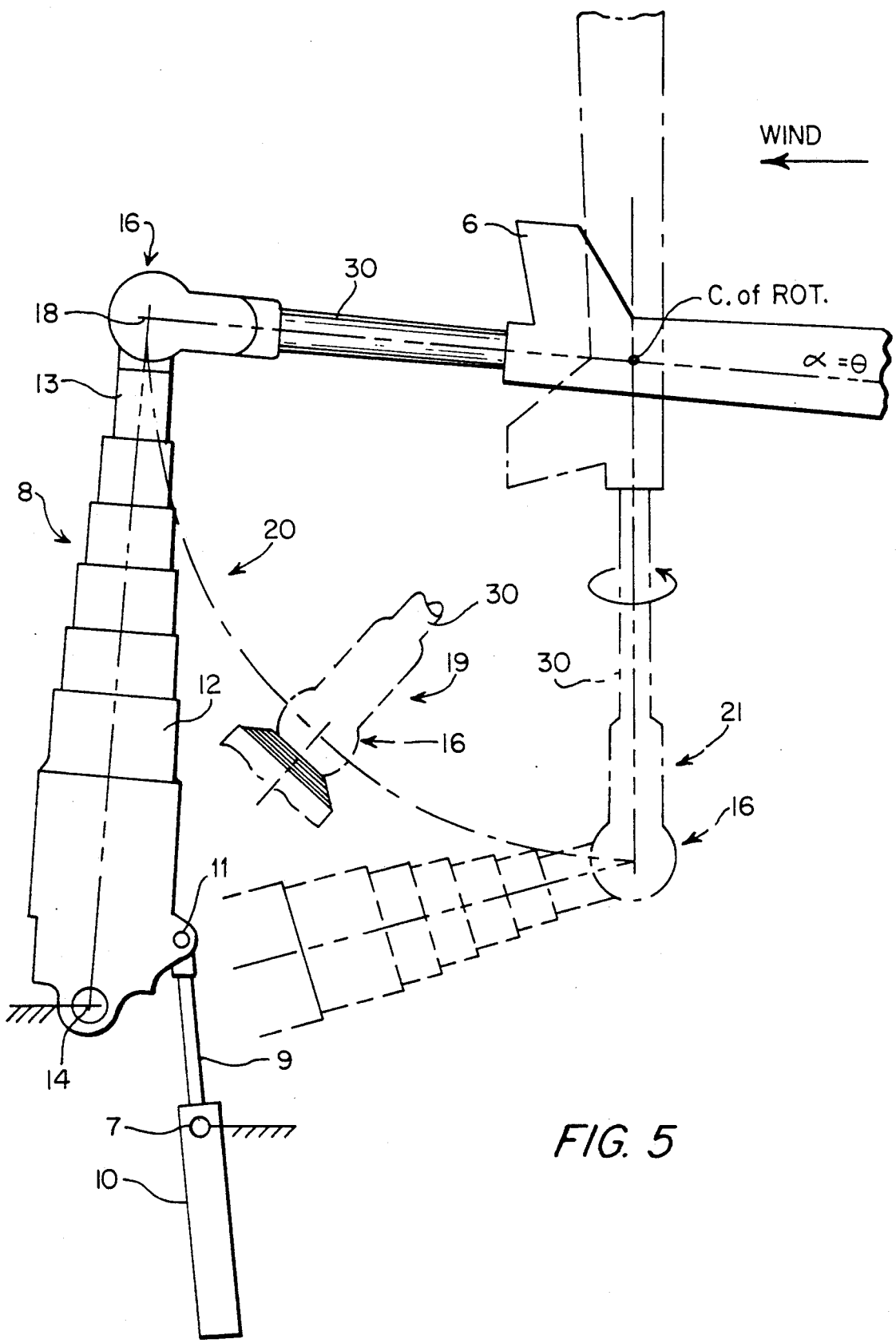
FIG. 5 is a side elevational view of the present mechanism.

In FIG. 1 a simplified diagrammatic view of the present invention is illustrated in conjunction with a model wind tunnel turntable 1. An aircraft model 6 is seen to be suspended over the turntable 1 by means of a positioning mechanism generally indicated by reference numeral 8. In utilizing the apparatus shown in FIG. 1, the aircraft model 6 is positioned with its wings generally horizontal and pitch variations in the angle $\alpha$ is shown in the figure. The positioning mechanism 8 is capable of pivoting the model 6 by a pitch angle $\alpha$ which may vary from −5° to +90°. In FIG. 2 a high pitch orientation for the model 6 is illustrated within the confines of the wind tunnel ceiling 2 and floor 4. In addition to the pitch angle $\alpha$, the model 6 may undergo deflection along a yaw angle $\beta$ due to the mounting of the positioning mechanism 8 to the turntable periphery.

FIG. 3 illustrates the aircraft model 6 being rotated 90° so that its wings are maintained vertically. Displacement of the positioning mechanism 8 over a 90° range now effectively varies the yaw angle $\beta$ of the aircraft model. Pitch may be effectively simulated by rotation of the turntable by the pitch angle $\alpha$ indicated in FIG. 3. FIG. 4 depicts the turntable axis of rotation 3 for accomplishing pitch angle variation with wings vertical. Thus, with wings in a vertical direction, the aircraft model may be exposed to pitch and yaw angle displacements over a continuous wide range of compound angles.

FIG. 5 is a side elevational view of the mechanism 8 shown in greater detail. The central portion of the mechanism is seen to include a telescoping column including a number of telescoping segments 13. The base of the mechanism 8 includes a sleeve 12 into which the various segments may retract. It also encloses a telescope drive of conventional design (not shown) for extending or retracting the telescoping column. The base of the sleeve is pivoted at fixed pivot 14.

A hydraulic cylinder 10 is pivotally connected to the sleeve 12 so as to selectively cause its rotation about pivot 14. The cylinder 10 has its housing connected to a pivot 7, the latter being fixed so that the cylinder actuator arm 9 may be free to rotate in space as it becomes extended or retracted relative to the cylinder. The upper end of the actuator arm 9 is pivotally mounted to the telescoping column sleeve 12 at pivot 11.

The uppermost segment 13 of the telescoping column is attached to an upper joint, generally indicated by reference numeral 16. This joint is of the type employed in present-day aircraft for moving control surfaces of the aircraft wings, such as flaps. A pivotal connection at shaft 18 exists between the upper joint 16 and the telescoping mechanism 8. Rotation of the upper joint causes pitch angle change of aircraft 6, which is connected to the upper joint 16 via a connecting arm, conventionally referred to as a "sting" 30. In order to maintain a model 6 in a central portion of a wind tunnel, where the most uniform wind flow occurs, it is necessary to establish a center of rotation for the model which is fixed in space. A rotational axis extending through this point is likewise fixed in space. An exemplary center of rotation is indicated in FIG. 5 (C. of Rot.). Because simple pivotal displacement of upper joint 16 would vary the vertical position of the model 6, it is necessary to offset this vertical displacement of the upper joint with an oppositely directed displacement of the telescoping segments. Thus, when continuous pitch changes of the aircraft model are desired, the upper joint is rotated at the same time that the telescoping segments of mechanism 8 is adjusted so that the end result will be the displacement of the upper joint along a vertically oriented circle 20 of constant diameter centered about center of rotation. This is illustrated in FIG. 5 by two illustrative positions generally indicated by 19 and 21. As will be seen from these positions of the upper joint 16 and attached sting 30, the aircraft is pivoted about a rotational axis fixed in space so that a pure pitch angle displacement may be realized which will maintain the model in a central portion of a wind tunnel, as is desired.

While the pitch angle is maintained, the turntable 1 may be rotated so that yaw angle may be varied. In the perpendicular orientation of sting 30 as illustrated in dotted lines (FIG. 5), turning of the turntable 1 has the effect of turning a vertically oriented model about the vertically turning sting 30.

Figure 6:
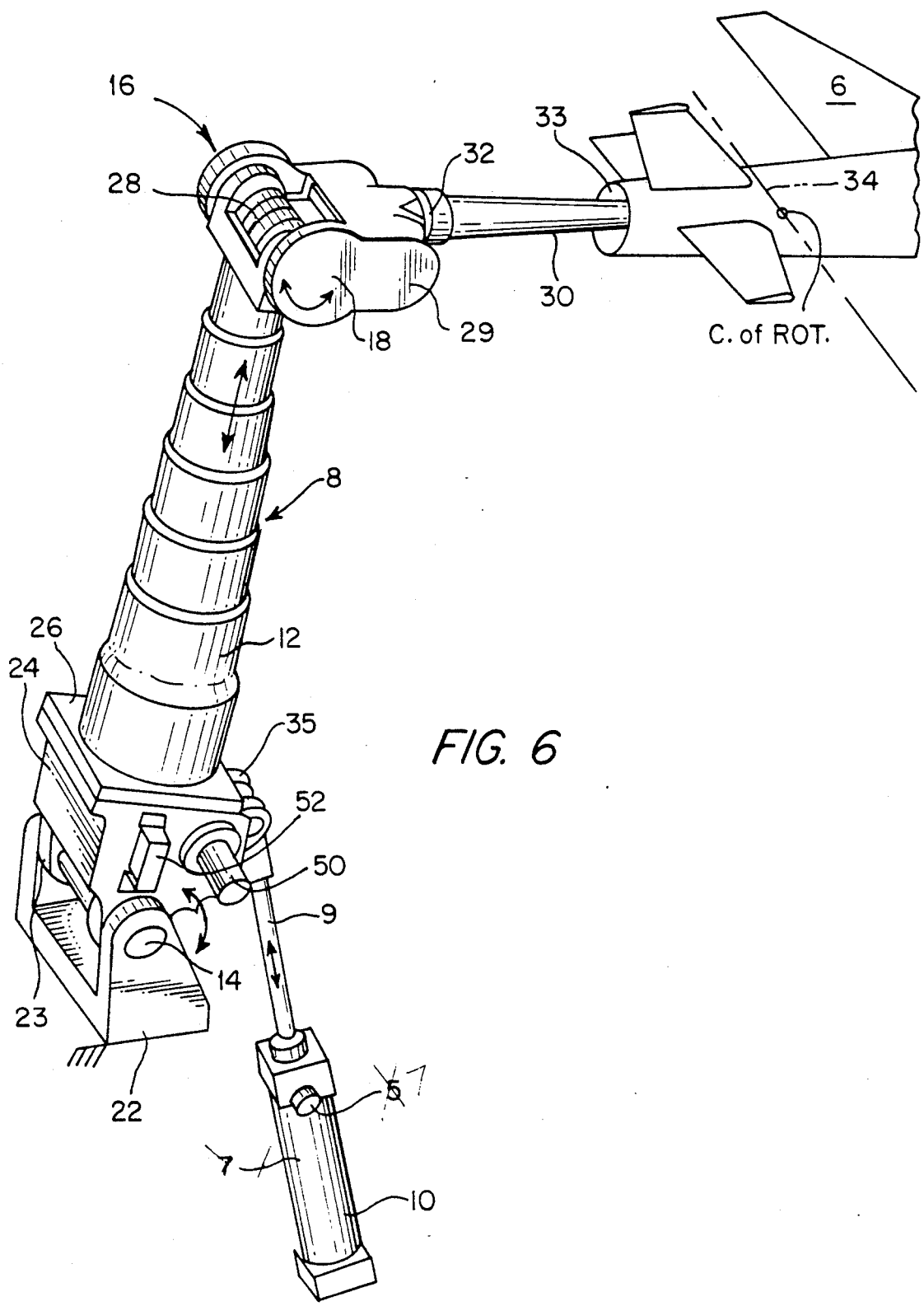
FIG. 6 is a perspective view of the present mechanism.

FIG. 6 shows the construction of the telescoping mechanism 8 and upper joint 16 in greater detail. A clevis-like support 22 would normally be fixed to the surface of a turntable, such as turntable 1 shown in FIG. 2. A column base 24 has lugs 23 appending downwardly therefrom to be received by pivot 14 which is secured at outer ends thereof to the support 22. The telescoping mechanism 8 is seated on the base surface 26.

The upper joint 16 is the type of mechanism used as a flap actuator on conventional aircraft. The heart of the joint 16 is a rotary actuator 28 having a pivotal shaft 18 axially positioned therethrough. A large swinging yoke 29 rotates about the shaft 18 and has a receptacle 32 at an outward end thereof for receiving one end of sting 30. The outward end 33 of the sting is fastened to a tapered member within the tail section of the model 6. The upper joint 16 rotates about the shaft 18 while the individual segments of the mechanism 8 may be extended or contracted. Finally, the hydraulic cylinder 10 has the outward end of its actuator arm 9 pivotally secured at 35 to the telescoping base 24. The housing of the cylinder 10 is free to rotate about pivot 5, the latter being fixed to the turntable. Thus, as actuator arm 9 is moved inwardly or outwardly of the hydraulic cylinder 10, the telescoping base 24 is caused to rotate about fixed pivot 14 so as to change the inclination of the mechanism 8. As previously explained, the combination of motions just summarized permits the upper joint 16 to undergo rotational motion in a vertically oriented circle 20 having constant radius. This will permit continuous adjustment of model pitch angle about an axis of rotation 34 (FIG. 6) which passes through the center of rotation of the model.

Figure 7:
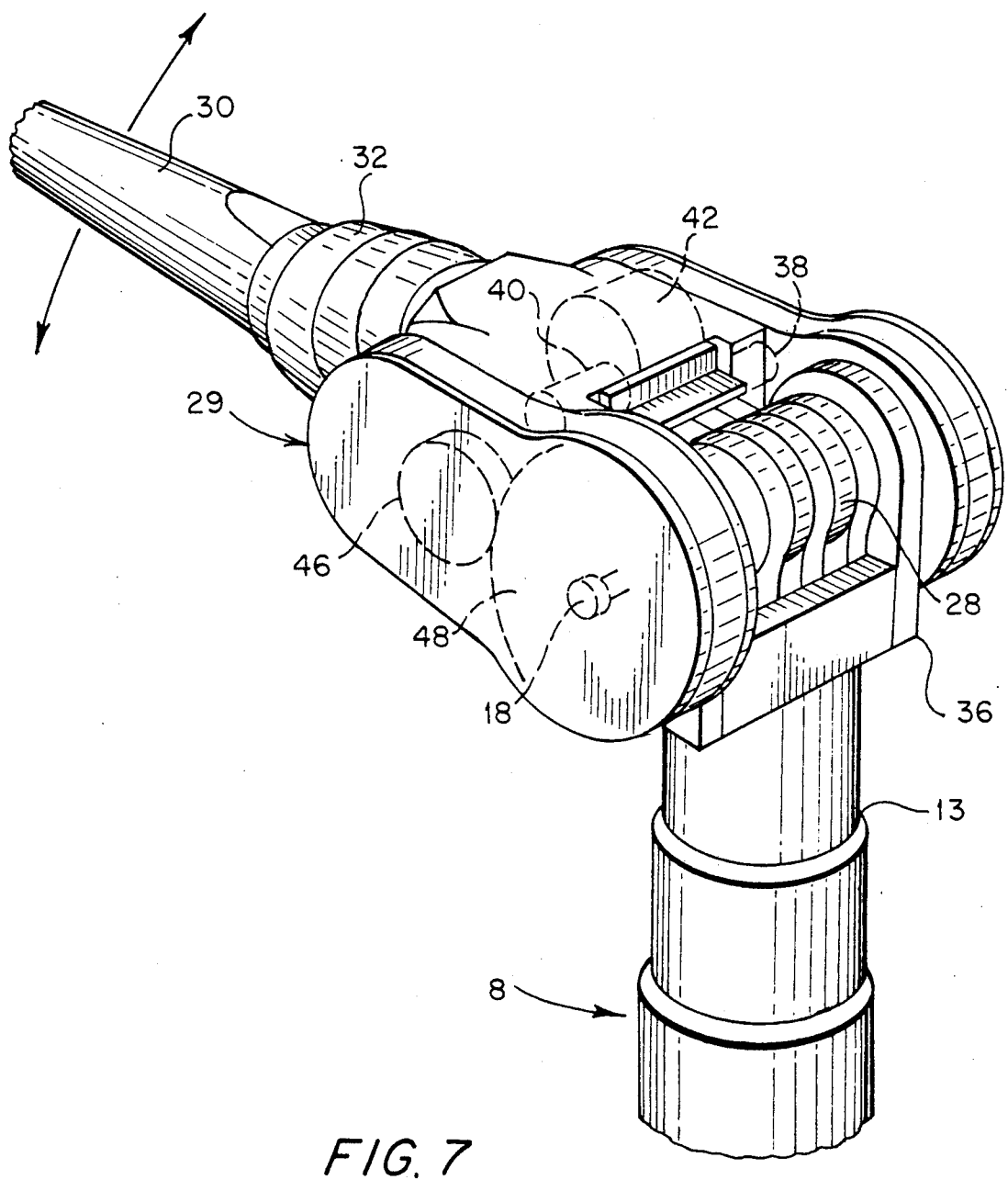
FIG. 7 is a perspective view of the upper joint portion of the present invention.

FIG. 7 shows in even greater detail the construction of the upper joint 16. The upper telescoping segment 13 is secured to fixed yoke 36. The swinging yoke 29 rotates about the fixed yoke 36 when the rotary actuator 28 is powered by hydraulic motor 40. In order to precisely stop the upper joint at a preselected position, a normally closed hydraulic brake 42 is released.

A power gear train exists between the hydraulic motor 40 and the rotary actuator 28. A simplified gear train is indicated by individual gears 46 and 48, the latter being contained within the swinging yoke 29. A position potentiometer 38 is mechanically linked to the power gear train for measuring the degree of angular orientation of the upper joint 16. A number of the latter-mentioned components are diagrammatically shown by dotted lines in FIG. 7 and are not shown or discussed in detail since the joint is a conventional mechanism as employed to position aircraft flaps.

Whereas the hydraulic motor 40 furnishes power to rotate the upper joint 16, the hydraulic motor 50, shown in FIG. 6, powers a conventional screw member within the telescoping mechanism 8 for extending the telescoping segments as required. A conventional positional sensor 52 detects the degree of telescoping column extension. Hydraulic power components instead of electrical components are used to avoid interference with electronic measurements.

Control of the hydraulic motors 40, 50 and hydraulic cylinder 10 is achieved by conventional microprocessor control. Since such techniques are well-established in the art, they will not be shown or described in this specification. However, it should be noted that kinimatic equations are stored in memory and solved ten times a second to coordinate the various rotational and linear displacements for the telescoping column, upper joint and turntable, as functions of desired model yaw and pitch angle.

Thus, from the above-described invention, it will be appreciated that the present invention offers a plane model positioning mechanism which is capable of continuously and accurately varying yaw and pitch angle so as to precisely simulate desired model positions within a wind tunnel.

It should be understood that the invention is not limited to the exact details of construction shown and described herein for obvious modifications will occur to persons skilled in the art.

We claim:

1. A wind tunnel model movable support comprising:
   a telescoping column;
   hydraulic means connected to the column enabling pivoting of the column about an axis passing through its base;
   a joint connected to a top segment of the column for rotation about an axis perpendicular to the column;
   a sting connected at a first end thereof to the joint while a second end of the sting is secured to the model;
   hydraulic means connected to the column for varying the length thereof;
   hydraulic means for rotating the joint; and
   a turntable for supporting the column thereon;

wherein coordinated continuous movement of the joint and column in a plane results in corresponding continuous first angle change of a model about a rotational axis fixed in space; and further wherein turntable rotation varies the orientation of the model about a second axis.

2. The structure set forth in claim 1 wherein the sting supports the model in a horizontal wing orientation whereby the first angle is pitch angle and the second angle is yaw angle.

3. The structure set forth in claim 1 wherein the sting supports the model in a vertical wing orientation whereby the first angle is yaw angle and the second angle is pitch angle.

* * * * *

UNITED STATES PATENT AND TRADEMARK OFFICE
CERTIFICATE OF CORRECTION

PATENT NO. : 5,020,364

DATED : June 4, 1991

INVENTOR(S) : Philip J. Mannit, et al.

It is certified that error appears in the above-identified patent and that said Letters Patent is hereby corrected as shown below:

Column 2, line 10, after "present" insert --invention with--.

Signed and Sealed this

Sixth Day of October, 1992

Attest:

DOUGLAS B. COMER

Attesting Officer

Acting Commissioner of Patents and Trademarks